Sept. 17, 1963
J. L. HILL ET AL
3,104,318
INTEGRATING CIRCUIT
Filed Nov. 20, 1961
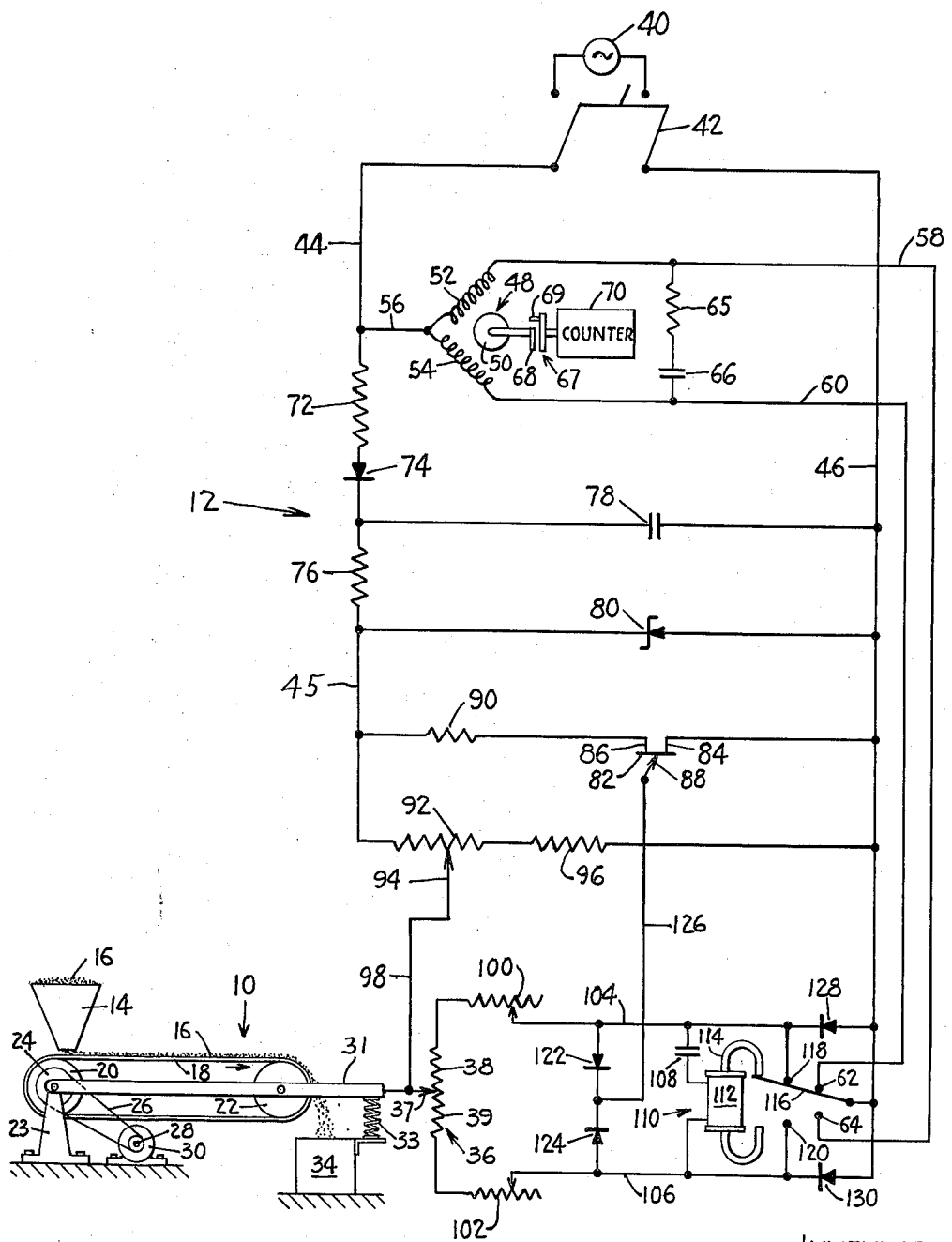
INVENTORS
BERND H. RICHELMANN
JOHN L. HILL
BY Meyers & Peterson
ATTORNEYS United States Patent Office 3,104,318
Patented Sept. 17, 1963

3,104,318
INTEGRATING CIRCUIT
John L. Hill, North St. Paul, and Bernd H. Richelmann, St. Paul, Minn., assignors to Ramsey Engineering Company, St. Paul, Minn., a corporation of Minnesota
Filed Nov. 20, 1961, Ser. No. 153,366
13 Claims. (Cl. 235—183)

This invention relates generally to integrators, and pertains more particularly to an integrating device for computing the summation on a time basis of a varying measurement or function such as weight or power. Where these particular measurements are involved, the integrating circuit will convert pounds per minute to total pounds, or watts to total watt-hours for specific and relatively long time periods.

One important object of the invention is to provide an integrating circuit that is accurate and reliable. In this regard, the invention has for an aim the provision of intrinsic compensation for ambient effects. Among the more prevalent ambient effects would be temperature, voltage and component aging, although the invention will automatically take into account similar effects because the invention makes use of equal changes in alternate time intervals and therefore the least possible change is reflected in the output reading.

Another object of the invention is to provide an integrating circuit that may be readily connected to conventional potentiometric instruments that are widely used in industrial and laboratory applications. Thus, elaborate conversion equipment need not be employed in order to provide a satisfactory input to the integrating circuit constituting the present invention.

A further object of the invention is to provide an integrator that will integrate both positive and negative quantities.

Still another object of the invention is to provide an integrating circuit that does not require elaborate or complex read-out equipment. More specifically, the invention has for an aim the use of a conventional decade mechanical counter, the registered count being indicative of the quantity or function that has been integrated over a given period of time.

Yet another object of the invention is to provide an integrating device that is quite compact, rugged in its construction, low in manufacturing costs, and one which will not get out of order readily.

Quite briefly the instant invention converts a quantitative measurement into alternate short time intervals each having a specific relationship to the value of the instantaneous measurement. These short time intervals are in turn converted into forward and reverse angular shaft rotations. Each period of shaft rotation is at a constant velocity and for a defined interval of time in accordance with the magnitude of the measured function. Thus during a relatively long time period, the net number of revolutions or fractions of revolutions is proportional to the time integral of the measured quantity or function.

These and other objects and advantages of this invention will more fully appear from the following description, made in connection with the accompanying drawing, in which the single FIGURE that has been selected for illustrating the invention constitutes a schematic circuit shown in association with a simplified weighing mechanism of conventional construction.

Referring now in detail to the drawing, the weighing mechanism that has been depicted is denoted generally by the reference numeral 10. The integrating circuit exemplifying the invention, on the other hand, has been indicated in its entirety by the reference numeral 12. At the outset, it will be understood that the circuit 12 is susceptible to use with a variety of mechanisms, the weighing mechanism 10 being only illustrative.

Having selected the weighing mechanism 10, a brief description of its construction will be given. In this regard, a hopper 14 containing the material 16 to be weighed surmounts a conveyor belt 18. The conveyor belt 18 is entrained about two rollers 20, 22. The roller 20 is rotatably carried at the upper end of a pair of spaced standards or upright supports 23. The roller 20 has affixed at one end thereof a pulley or sprocket 24 about which passes a belt or chain 26. The belt or chain 26 also passes about a pulley or sprocket 28 on a drive motor 30. It will be assumed that the motor 30 operates at a constant speed so that the belt 18 is correspondingly advanced at a steady or uniform rate. A pair of laterally spaced horizontal arms 31 are pivotally connected to the shaft about which the roller 20 rotates, the arms carrying near their opposite ends the previously referred to roller 22. The ends of the arms 31 opposite the roller 20 are supported on a compression spring 33 of such strength and elasticity to support the weight of the arms 31, the roller 22, the belt 18, etc. and to deflect in a prescribed amount in response to the weight of the material 16 actually present on the belt at any instant. After being weighed, the material 16 is discharged from the belt 18, a receptacle 34 having been depicted as the means for receiving the weighed material.

At this time attention is called to the employment of a potentiometer 36 having a slider 37 engaging resistance portion 38, 39. The values of the resistance portions 38 and 39, of course, are varied or changed in a complementary manner with any movement of the slider 37. In the schematic arrangement that has been pictured, the slider 37 will be moved directly into various positions representative of the quantity or function being integrated by the weighing mechanism 10. In actual practice, though, a potentiometric instrument would be selected which would include a servomotor to position the slider 37, and therefore provide an adequate amount of force available for moving the slider 37 irrespective of the size of the particular mechanism 10. More specifically, quantities involving only microwatt power levels could be satisfactorily integrated as long as sufficient power is provided for positioning the slider 37 with respect to the resistance portions 38, 39 of the potentiometer 36. Also, it should be made manifest at this time that the invention is in no way limited to a use in conjunction with weighing apparatus. Instead, the invention will find utility in various situations where an integration is to be performed.

Describing now the integrating circuit 12 in detail, it will first be mentioned that an alternating current source of potential 40 is depicted. By means of a disconnect switch 42, the A.-C. source 40 may be connected to a pair of busses 44, 46.

Although its function will not be completely apparent at this time, reference is to be made at this point to a reversible motor 48 having an armature 50 and field windings 52, 54. Because of the role the motor 48 plays in the circuit 12, it is highly desirable that the motor have instant reversing capabilities. Accordingly, a permanent magnet type synchronous A.-C. motor is recommended. One motor that has been found very satisfactory in actual use is a motor manufactured by the Superior Electric Company of Bristol, Connecticut which is identified as their SLO-SYN synchronous motor type SS-50. This motor is actually a stepping motor and needs no electrical or mechanical braking because it has the ability to stop in less than five degrees of motor shaft rotation, and to instantly reverse its direction of rotation upon application of power in a manner to cause opposite rotation.

The connections for the motor 48 include a conductor 56 extending between the bus 44 and the junction of the windings 52 and 54. The other ends of the windings 52, 54 are connected to conductors 58 and 60, respectively, leading to contacts 62 and 64 which will be described more fully hereinafter. Inasmuch as the source 40 is a single phase A.-C. supply, the need for a phase-shifting network arises, and accordingly a resistor 65 and capacitor 66 are connected across the conductors 58, 60.

The armature 50 of the motor 48 is connected to a coupling 67. This coupling 67 is preferably of the "lost-motion" type and in its illustrated form includes a radially directed pin 68 on the motor shaft and an axially directed pin 69 on the shaft of a revolution counter 70. The "lost-motion" coupling, it will be appreciated prevents the oscillatory character from being apparent at the counter 70. Preferably, an intermediate gear train (not shown) can be added where circumstances so dictate. The counter 70, it can be pointed out, conventionally consists of a plurality of number wheels which are visible through a window that is customarily provided.

Included in the conductor 44 is a dropping resistor 72 and a diode 74 for rectifying the A.-C. voltage supplied from the source 40. A filter composed of a resistor 76 and a capacitor 78 present a relatively smooth D.-C. potential for use in a manner soon to be described. For the purpose of regulating the D.-C. voltage supply, a Zener diode 80 is connected across the conductors 45, 46. The Zener diode 80 merely keeps the voltage that is supplied within predetermined limits.

What the General Electric Company terms a "silicon unijunction transistor" has been given the reference numeral 82. General information relating to this type of transistor is available in promotional literature and is also set forth in General Electric Transistor Manual. The manual lists six different unijunction transistors designated as types 2N489 through 2N494.

As shown in the drawing, the unijunction transistor 82 is provided with two bases 84, 86 and an emitter 88. The bases 84 and 86, which are generally referred to as base-one and base-two, respectively, are connected in circuit with a current limiting resistor 90. Although descriptive information is available, as above pointed out, it might be mentioned that in the cut-off or standby condition of the transistor 82, the emitter and interbase power supplies establish potentials between the bases 84 and 86, and at the emitter 88, such that the emitter is back biased. If the emitter potential is increased sufficiently to overcome this bias, holes (minority carriers) are injected into the silicon bar. These holes are swept towards the base 84 by the internal field in the bar. The increased charge concentration, due to these holes, decreases the resistance and hence decreases the internal voltage drop from the emitter to the base 84. The emitter current then increases regeneratively until it is limited by the emitter power supply. It is believed that this background material will be helpful in understanding the operation of the invention which will later be presented.

While reference has already been made to the potentiometer 36, a second potentiometer 92 is connected in circuit across the conductors 45, 46. This potentiometer 92 has a slider 94 for the selection of the proper potential to be applied to the slider 37 of the potentiometer 36, a conductor 98 providing the electrical connection. Also in circuit with the potentiometer 92 is a fixed resistor 96. Inasmuch as the potentiometer 92 and the resistor 96 are connected across the busses 45 and 46, the voltage drop between the slider 94 and the conductor 46 can be construed as being the actual D.-C. supply voltage which is utilized in the operation of the circuit 12. However, two parallel electrical paths are intended, and in this regard a rheostat or adjustable resistor 100 and a similar rheostat 102 are connected in circuit with conductors 104 and 106, respectively, these rheostats permitting adjustments to be made to the circuitry.

Of considerable importance to a practicing of the invention is a capacitor 108 which has a polarized relay 110 associated therewith. More specifically, the operating coil denoted by the reference numeral 112 of the relay 110 is connected in series with the capacitor 108 between the conductors 104 and 106. As is conventional with relays of this character, a permanent magnet 114 is included as part of the structure of the relay, which maintains the movable or shiftable armature 116 in its last operated position. The armature, in this instance, also serves as one contact for the relay, being connected to the bus 46. Not only does the armature 116 act as a shiftable contact with respect to the previously mentioned contacts 62 and 64, but additionally coacts with spaced contacts 118 and 120, these latter contacts being connected to the conductors 104 and 106, respectively. The armature 116, it will be observed, is depicted in one contact position but is shiftable to a second contact position in which it engages the contacts 64, 120 by application of operating current in the opposite direction to that used to move it to the position shown.

Oppositely poled diodes 122, 124 are connected in a series manner across the conductors 104, 106. As can be seen from the circuit, the juncture of these diodes 122, 124 is connected to the emitter 88 of the unijunction transistor 82 via a conductor 126. For the purpose of assuring a full discharge of the capacitor 108 when the relay contacts 116, 118 or 116, 120 open prior to complete discharge, there are additional diodes 128, 130 placed in series with the conductors 104 and 106 for maintaining the discharge path.

With the foregoing information in mind, it is believed that an understanding of the operation of the circuit 12 can be had from the following operational sequence. As has already been indicated, the mechanism 10 is only of an exemplary nature. The potentiometer 36, by reason of the connection of its slider 37 to the mechanism 10, provides two resistances 38 and 39 which are inversely related to each other. In other words, if the slider 37 is moved downwardly, the resistance 38 in the upper portion of the potentiometer 36 is increased and the resistance 39 in the lower portion thereof is decreased. The specific resistance values provided by the potentiometer 36 will be in accordance with the position of the scale beam 31 at any given moment. The position of the scale beam 31 in turn is influenced by the weight of the material 16.

Consequently, with the armature 116 of the polarized relay 110 in engagement with the contacts 62 and 118, two things happen. First, an electrical path is completed through the field winding 54 of the motor 48 so that its armature 50 rotates in one direction. This is by virtue of the engagement of the armature 116 with the contact 62. Secondly, the D.-C. voltage furnished from the supply across the potentiometer 92 and the resistor 96 causes the capacitor 108 to be charged via an electrical path including the resistance portion 39, the rheostat 102, the operating coil 112 and the armature 116. The charging current is in such a direction as to reinforce the influence of the permanent magnet holding the armature in its last operated position. When the capacitor 108 becomes sufficiently charged, the juncture between the diodes 122, 124 will apply the proper potential to the emitter 88 of the unijunction transistor 82 so as to cause conduction thereof. This will in turn discharge the capacitor 108 and the discharge current of course flows through the operating coil 112 to shift the armature 116 to a position in which it engages the contacts 64 and 120. It will be appreciated that the discharge occurs at a rate sufficient to provide adequate energization of the operating coil 112 so as to overcome the effect of the permanent magnetization. Since the armature 116 may move away from the contact 118 to open the discharge circuit before a complete discharge of the capacitor 108, it can be seen that the diode 128 will maintain the discharge path so that the capacitor 108 will complete its discharge after the contact 120 is closed to the armature 116.

During the above-mentioned interval that the capacitor 108 was charging, the engagement of the armature 116 with the contact 62, as already stated, caused energization of the motor 48 so that its armature 50 rotated in what will be termed a backward direction. If the backward rotation of the armature 50 extended over a sufficient interval of time, this interval of time being dependent upon the length of time taken to charge the capacitor 108, the pin 68 would have made engagement with the pin 69 of the coupling 67 so as to cause a registration to be made on the counter 70. If the armature 50 rotated through only a partial rotation, the pin 68, however, would be stopped at a particular rotative position in accordance with the length of time taken to charge the capacitor 108.

When engagement is made with the contact 120 by the armature 116, it will be appreciated that the capacitor 108 is charged in a reverse direction. However, the same charging voltage is applied because it is from the same source provided by the potentiometer 92 and the resistor 96. When the capacitor 108 becomes sufficiently charged, then the proper potential is applied at the juncture of the diodes 122, 124 to cause conduction of the transistor 82 with a concomitant discharge of the capacitor 108. This second discharge of the capacitor 108 causes the armature 116 to be moved back to the position in which it appears in the drawing.

While the armature 116 was in engagement with the contact 120, the armature was also in engagement with the contact 64. Consequently, the motor 48 was caused to rotate in a forward direction. If the degree or amount of rotation is the same as during the backward rotation, then there will be a net rotation of zero, the pin 68 then being in precisely the same position that it was in at the beginning of the backward rotation. However, any difference will be reflected in the position of the pin 68 and if the difference is enough, then the counter 70 will show a commensurate registration, assuming that the forward rotation was adequate to provide such a registration.

What occurs then is that the motor 48 is caused to rotate in an opposite direction depending upon the position of the armature 116. Each interval of rotation is in turn governed by the time taken to charge the capacitor 108 to a predetermined state. The forward and reverse time intervals are selected so as to make their sum nearly constant and each interval would normally be for approximately one and a half to two seconds, although the time interval is susceptible to variation depending upon the particular function being integrated.

Over a period of time, assuming an initial balance of the potentiometer 36 which would provide two resistance portions 38 and 39 of the same magnitude and further assuming that rheostats 100 and 102 are adjusted for equal values, then for a constant delivery of material 16 onto the belt 18, a zero registration on the counter 70 would be indicative of a certain tonage of material that is being delivered to the weighing mechanism 10. A positive registration would obviously denote that a greater amount of material has passed over the conveyor belt 18, whereas a negative registration would indicate a lesser amount. Adjustment of the rheostats 100 and 102, of course, can provide longer or shorter charging times for the capacitor 108, and of course individual adjustments of these rheostats can determine whether a positive or negative registration is to be indicated on the counter 70. Thus, a zero registration on the counter 70 can be representative of a certain minimum quantity of material 16 for a given period of time and any count above a zero registration would be indicative of an increased quantity for that length of time.

It is important to understand that by switching back and forth between the two resistive paths which include the changing portions 38, 39 provided by the potentiometer 36, and the unchanging portions provided by rheostats 100 and 102, the charging time of the capacitor 108 for alternate intervals will be principally dependent upon the magnitudes of the portions 38, 39. It will also be recognized that the same voltage source is used for each alternate charging interval and inasmuch as the same circuit components are used during these alternate intervals including the unijunction transistor 82, the circuit 12 is highly reliable and accurate.

From the foregoing, it will be appreciated that the integration is accomplished by the variation between alternate periods of time taken for charging the capacitor 108 and the amount of net rotation of the motor armature 50 resulting from the accumulated time difference between a plurality of alternate charging intervals. The ohmic value of the resistance portion 38 (plus the value of the adjustable resistor 100) and the ohmic value of the resistance portion 39 (plus the value of the adjustable resistor 102) of course determine the length of the respective charging periods and hence the net amount of motor rotation.

It will, of course, be understood that various changes may be made in the form, details, arrangements and proportions of the parts without departing from the scope of this invention as set forth in the appended claims.

What is claimed:

1. An integrating circuit comprising a voltage supply, means providing complementary resistance portions representative of a function to be integrated, a capacitor, means responsive to a predetermined state of charge of said capacitor for alternately connecting said capacitor to said voltage supply through one of said resistance portions and then the other for successive time intervals, a reversible motor, means for causing operation of said motor in one direction while said capacitor is in circuit with said one resistance portion and in an opposite direction while said capacitor is in circuit with the other resistance portion, and means for indicating the net amount of movement of said motor and thus denote the time integral of said function for the period of alternate operation of said motor.

2. An integrating circuit comprising a voltage supply, a potentiometer having complementary resistance portions representative of a function to be integrated, a capacitor, means alternately charging said capacitor through one of said resistance portions and then the other for successive time intervals, means for discharging said capacitor each time it reaches a predetermined state of charge and for causing operation of said charging means, a rotatable motor, means for causing rotation of said motor in one direction while said capacitor is being charged through said one resistance portion and in an opposite direction while said capacitor is being charged through said other resistance portion, and means driven by said motor for indicating the net amount of rotation in either direction and thus the time integral of said function.

3. An integrating circuit in accordance with claim 2 in which said resistance portions are connected in parallel across said voltage supply and in which said means for alternately charging said capacitor connects said capacitor in series with said one resistance portion and then in series with said other resistance portion.

4. An integrating circuit in accordance with claim 3 in which said potentiometer includes a slider movable in relation to said function when said function is changing thereby in turn to increase the resistance of said one resistance portion and to simultaneously decrease the resistance of said other resistance portion.

5. An integrating circuit comprising a voltage supply, means for providing first and second resistances variable in a complementary manner with respect to a function to be integrated, a reversible electric motor, a capacitor, first means for charging said capacitor from said voltage supply in accordance with the magnitude of said first resistance, second means for charging said capacitor from said voltage supply in accordance with the magnitude of said second resistance, means responsive to a predetermined state of charge of said capacitor for discharging said capacitor, means responsive to the discharging of said capacitor for switching from said first charging means to said second charging means and vice versa during successive time intervals, first means controlled by said switching means for energizing said motor for rotation in one direction while said first charging means is causing charging of said capacitor, second means controlled by said switching means for energizing said motor for rotation in an opposite direction while said second charging means is causing charging of said capacitor, and means driven by said motor for indicating the net amount of motor rotation thereby denoting the integral of said function as to magnitude and time during the period consisting of said successive intervals.

6. An integrating circuit in accordance with claim 5 in which said switching means includes a relay in series with said capacitor so that said capacitor discharges through said relay to effect alternate control of said first and second energizing means.

7. An integrating circuit in accordance with claim 6 in which said relay is a polarized relay having armature movable into either of two positions to render effective said first energizing means when in one position and to make effective said second energizing means when in its other position.

8. An integrating circuit comprising a voltage supply, means for providing first and second resistances variable in a complementary manner with respect to a function to be integrated, a reversible electric motor, a capacitor, a polarized relay having an operating coil in series with said capacitor and an armature movable into either of two positions when said coil is sufficiently energized, said relay also being provided with first and second contact means closable when said armature is in one of its positions and third and fourth contact means closable when said armature is in its other position, means in circuit with said first contact means for causing said capacitor to be charged to one polarity state through said first resistance from said voltage supply when said armature is in its said one position, means in circuit with said second contact means for energizing said motor to cause rotation thereof in one direction while said capacitor is being charged to said one polarity state, means in circuit with said third contact means for causing said capacitor to be charged to an opposite polarity state through said second resistance from said voltage supply when said armature is in its said other position, means in circuit with said fourth contact means for energizing said motor to cause rotation thereof in a reverse direction while said capacitor is being charged to said opposite polarity state, means responsive to a predetermined state of charge of said capacitor for discharging said capacitor through said operating coil to cause shifting of said armature from its said one position to its said other position and vice versa depending upon the direction of discharge of said capacitor through said coil to thereby cause said motor to operate in alternate directions, and means driven by said motor for indicating the net amount of motor rotation thereby denoting the integral of said function as to magnitude and time for the period of alternate operation of said motor.

9. An integrating circuit in accordance with claim 8 in which said discharging means includes a pair of oppositely poled diodes in parallel with said serially connected capacitor and operating coil and a device connected to the juncture of said diodes for sensing when said capacitor has reached said predetermined state of charge to initiate a discharge thereof.

10. An integrating circuit in accordance with claim 9 in which said device is a semi-conductor.

11. An integrating circuit in accordance with claim 10 in which said device is a unijunction transistor.

12. An integrating circuit comprising a source of direct current potential, a potentiometer having its slider positionable in accordance with a function to be integrated, a reversible electric motor, a capacitor, a polarized relay having an operating coil connected in series with said capacitor across the ends of said potentiometer, a first contact connected to the side of said capacitor that is connected to one end of said potentiometer, a second contact connected to the end of said coil that is connected to the other end of said potentiometer, and an armature contact movable with either of two positions to engage within said first or second contact, means connecting said slider and said armature contact to opposite sides of said potential source whereby said capacitor will be charged through one resistance portion of said potentiometer when said armature contact is engaging said first contact and will be charged through the remaining resistance portion of said potentiometer when said armature contact is engaging said second contact, a pair of oppositely poled diodes connected in parallel with said serially connected capacitor and coil, a unijunction transistor having its two bases connected in circuit with said potential supply and its emitter connected to the juncture of said diodes so as to discharge said capacitor when a sufficient potential exists at said juncture whereby flow of discharge current through said coil will determine which of said first and second contacts said armature contact engages, respective means controlled by the particular position of said armature contact for causing said motor to rotate in one direction when engaging said first contact and in a reverse direction when engaging said second contact whereby the successive intervals during which said motor rotates in either direction will be in accordance with the time taken to charge said capacitor via said first or second contact, and means for indicating the net degree of rotation of said motor in either direction to provide a time integral of said function.

13. An integrating circuit comprising means for providing first and second complementary resistances representative of a function to be integrated, a reversible electric motor, a capacitor, means for alternately charging said capacitor to a predetermined state of charge from the same potential source in accordance with said first and second resistances, means for causing said motor to rotate in one direction while said capacitor is being charged in accordance with said first resistance, means for causing said motor to rotate in an opposite direction while being charged in accordance with said second resistance, and means driven by said motor for indicating the net amount of motor rotation and thus the integral of said function as to magnitude and time for the period of alternate operation of said motor.

References Cited in the file of this patent

UNITED STATES PATENTS 3,032,270  Corbin _____ May 1, 1962